United States Patent [19]

Frei

[11] Patent Number: 4,738,354
[45] Date of Patent: Apr. 19, 1988

[54] CONVEYING DEVICE

[75] Inventor: Hans Frei, Oetwil am See, Switzerland

[73] Assignee: Ferag AG, Hinwil, Switzerland

[21] Appl. No.: 846,056

[22] Filed: Mar. 31, 1986

[30] Foreign Application Priority Data

Apr. 9, 1985 [CH] Switzerland .......................... 1509/85

[51] Int. Cl.$^4$ ............................................ B65G 21/10
[52] U.S. Cl. .................................................. 198/861.2
[58] Field of Search ................... 198/861.1, 861.2, 369

[56] References Cited

U.S. PATENT DOCUMENTS

| 2,711,240 | 6/1955 | Smallegan | 198/861.1 X |
| 4,294,345 | 10/1981 | Stauber et al. | 198/683 |
| 4,489,826 | 12/1984 | Dubson | 198/861.2 X |
| 4,618,057 | 10/1986 | Howser | 198/861.2 |

FOREIGN PATENT DOCUMENTS

| 987625 | 4/1976 | Canada | 198/861.2 |
| 623794 | 12/1978 | Switzerland | |
| 1568752 | 6/1980 | United Kingdom | |

Primary Examiner—Stephen J. Novosad
Assistant Examiner—William P. Neuder
Attorney, Agent, or Firm—Werner W. Kleeman

[57] ABSTRACT

An endless chain is guided in each one of two adjacently extending guide channels, for entraining articles or objects to be conveyed, such as newspapers delivered in an imbricated formation. A guide channel section is displaceably arranged transversely to a receiving station in order that the articles or objects can be conducted to the receiving station not only from one supply station but also from a further supply station as well. The displacement of the guide channel section is executed in a region between two transition sections which extend in the same direction relative to each other. In such arrangement, displacement of the guide channel section can be effected without altering the length of the guide channel.

13 Claims, 4 Drawing Sheets

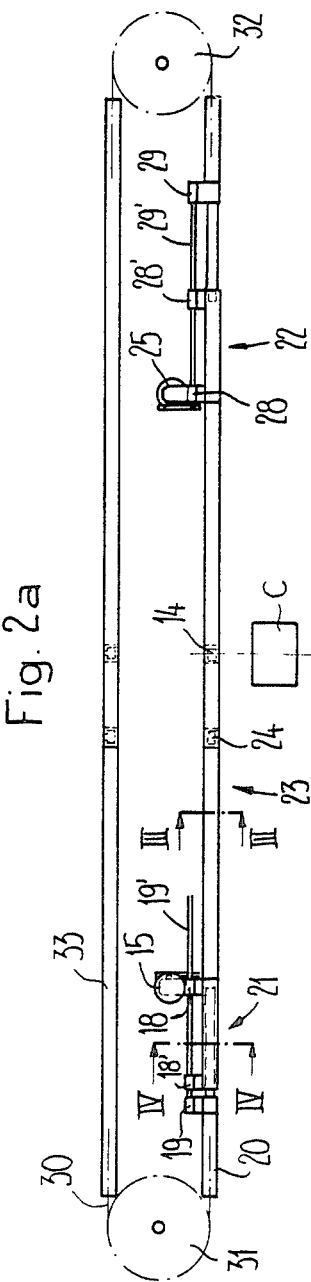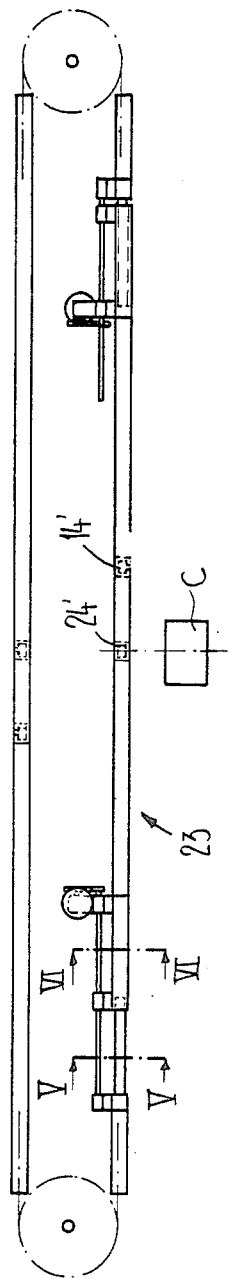

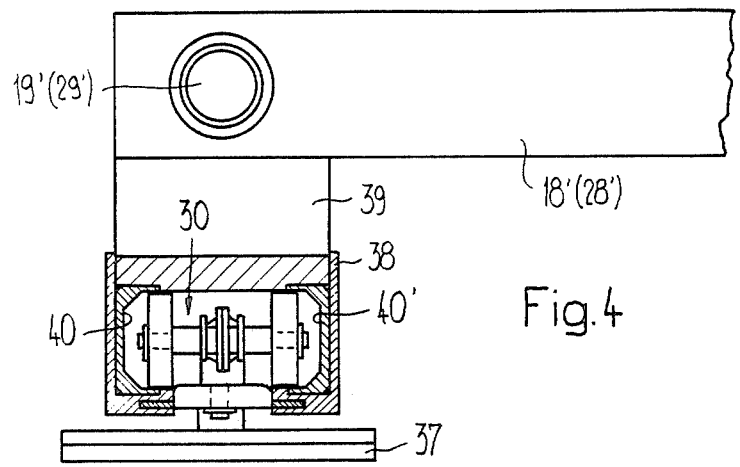
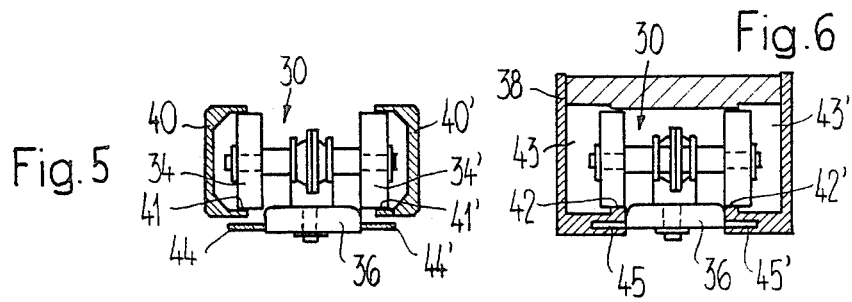
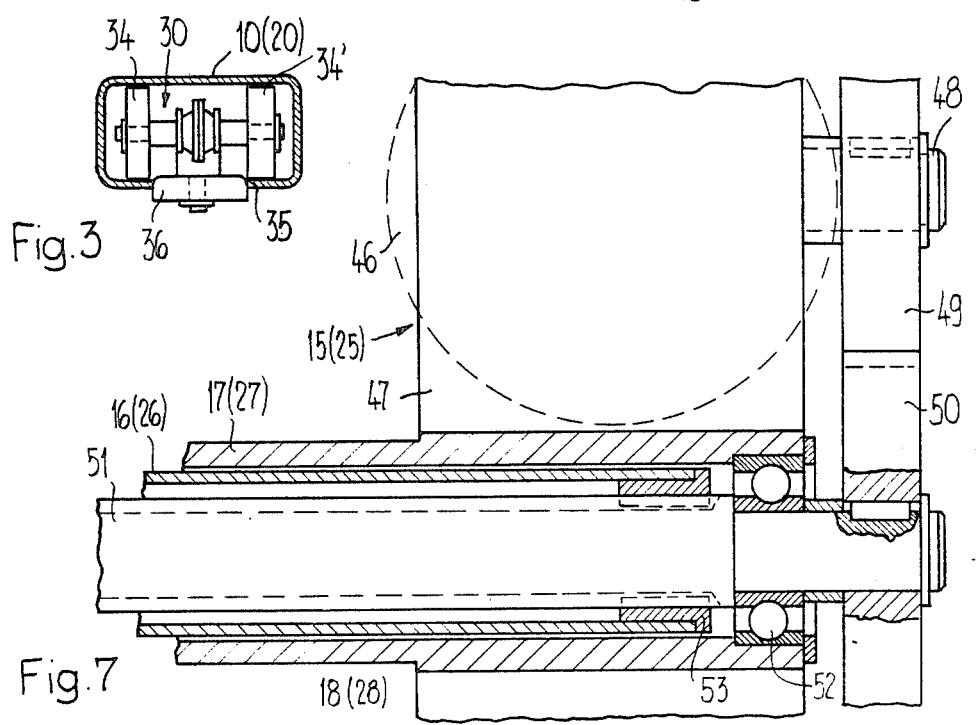

CONVEYING DEVICE

BACKGROUND OF THE INVENTION

The present invention broadly relates to a new and improved construction of a conveying device.

In its more particular aspects, the present invention specifically relates to a new and improved construction of a conveying device containing at least one guide channel and an endless chain guided within the guide channel for the entrainment of objects or articles to be conveyed from a first station to a second station.

Such conveying device is especially suitable for conveying printed products, such as, for example, newspapers produced by a rotary printing process. In such applications, it is frequently required to couple one of the stations, which can be either a supply or dispatching station or a receiving station, selectively to more than one conveying device, or, alternatively, to couple a conveying device selectively to more than one such station. Since no switches or turnouts can be used with an endless chain, it has heretofore been usual, for example, in the case of two adjacently extending guide channels, to shift or displace the station between the two guide channels when the printed products, for example, should be delivered alternatingly from various supply or dispatching stations to a single receiving station. The receiving station, for example, may constitute a device of the type described in Swiss Pat. No. 623,794, granted June 30, 1981, and the cognate British Patent No. 1,568,752, directed to a device for stacking folded printed products which continuously arrive in an imbricated formation.

The endless chain used for a conveying device of the previously mentioned type is preferably a universal-joint link chain provided with travelling wheels. The universal-joint link chain is guided in a guide channel having a downwardly open substantially C-shaped cross-section. Such a chain is described, for example, in Swiss Pat. No. 588,647, granted Apr. 15, 1977, and cognate with U.S. Pat. No. 4,294,345, granted Oct. 13, 1981.

SUMMARY OF THE INVENTION

Therefore, with the foregoing in mind, it is a primary object of the present invention to provide a new and improved construction of a conveying device which does not exhibit the aforementioned drawbacks and shortcomings of the prior art constructions.

Another and more specific object of the present invention aims at providing a new and improved construction of a conveying device by means of which one station can be selectively served by a selected one of at least two conveying streams of conveyed articles or objects or, alternatively, two stations can be served by one such conveying stream without changing the position or location of such stations.

Yet a further significant object of the present invention aims at providing a new and improved construction of a conveying device which is relatively simple in construction and design, extremely economical to manufacture, highly reliable in operation, not readily subjected to breakdown or malfunction and requires a minimum of maintenance and servicing.

Now in order to implement these and still further objects of the invention which will become more readily apparent as the description proceeds, the conveying device of the present invention is manifested by the features that, two transition sections extending in the same direction are provided for the guide channel. Between the two transition sections, a displaceable guide channel section is arranged for displacement relative to these transition sections in their lengthwise direction. In the region of one of the two stations, the displaceable guide channel section comprises an intermediate member or component extending at an angle relative to the transition sections.

Due to the inventive construction there is rendered possible a parallel displacement of the conveying track arrangement while always maintaining a constant chain length. In this manner, the heretofore required translation or displacement of the station is eliminated. When the intermediate member of the guide channel associated with the station extends at right angles or perpendicular to the transition sections, there will then result for the required length of the aforementioned parallel displacement the smallest possible displacement path of the displaceable guide channel section. It is, however, also possible to arrange the intermediate member at an angle deviating from 90° for adaptation to spatial conditions. However, a greater length of displacement will then be required.

In a preferred embodiment which is especially advantageous when a station is intended to be alternatingly served by two conveying streams of conveyed articles or objects, the displaceable guide channel sections of two guide channels are intercoupled for simultaneous displacement. The length of displacement then corresponds to the spacing in the displacement direction between the center lines of the intermediate members which extend essentially parallel to each other. The aforementioned station, for example, can be set up to stack newspapers which are successively fed from two different sources.

In a further preferred embodiment the displaceable guide channel section essentially extends in an S-shape and presents an optimum course of the displaceable guide channel section and therein only two guide channel bends of 90° are necessary.

In another preferred embodiment the guide channel has a substantially C-shaped cross-section and contains rolling surfaces on which travelling wheels can roll and which travelling wheels are present on both sides of the endless chain. Entrainment members for entraining the objects or articles to be conveyed are mounted at the chain and protrude from the guide channel. The transition sections contain stationary guide members and extendable guide members which cooperate with the stationary guide members. Rolling surfaces of these transition sections are subdivided in lengthwise direction such that one portion of such rolling surfaces is associated with the stationary guide members and an other portion of such rolling surfaces is associated with the extendable guide members. There are thus produced step-free rolling surfaces of variable length.

In a preferred embodiment guide wheels for laterally guiding the chain engage with the opening of the substantially C-shaped guide channel. Lateral guide rails are associated with related U-shaped inner guide members or rails in a spaced relationship and engage lengthwise grooves in related outer guide members. There is thus ensured lateral guidance of the endless chain and that the endless chain is also impeccably laterally guided in the variable length transition section in order to thereby prevent slide-off from the rolling surfaces.

In yet another preferred embodiment, the inner guide members constitute the stationary guide members, so that the outer guide members are associated with the displaceable guide channel section.

According to another preferred embodiment, each of the two transition sections possesses a displacing drive. The displacing drives are preferably electrically synchronizable in order to avoid canting of the displaceable guide channel section. The electrical synchronization, for example, can be achieved by synchronous motors, by stepping motors or by an electrical shaft.

According to another preferred embodiment, it is also possible to provide a single displacing drive and to interconnect the two transition sections by a Cardan drive shaft which is acted upon by the single displacing drive.

In a preferred embodiment the displacing drive is rigidly connected with the extendable or displaceable guide channel sections and a spindle serves for converting a rotary motion of an electric drive motor into a linear motion or displacement, although it is also conceivable to use, for example, a toothed rack or a crank drive for such conversion.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein:

FIG. 2a side view of the conveying device shown in FIG. 1;

FIG. 2b is a side view corresponding to FIG. 2a but with the guide channel section shifted to the right;

FIG. 3 is a cross-section taken substantially along the line III—III in FIG. 2a and shows a guide channel with a universal-joint link chain guided therein;

FIG. 4 is a cross-section taken substantially along the line IV—IV in FIG. 2a and shows an extendable or displaceable guide channel section in the retracted state;

FIG. 5 is a cross-section taken substantially along the line V—V in FIG. 2b through the inner guide members shown in FIG. 4;

FIG. 6 is a cross-section taken substantially along the line VI—VI in FIG. 2b through the outer guide members shown in FIG. 4;

FIG. 7 is a longitudinal section through a spindle of a displacing drive in the conveyor device shown in FIG. 1.

DETAILED DESCRIPTION OF THE PREFERRED EMBODIMENTS

Figure 1:
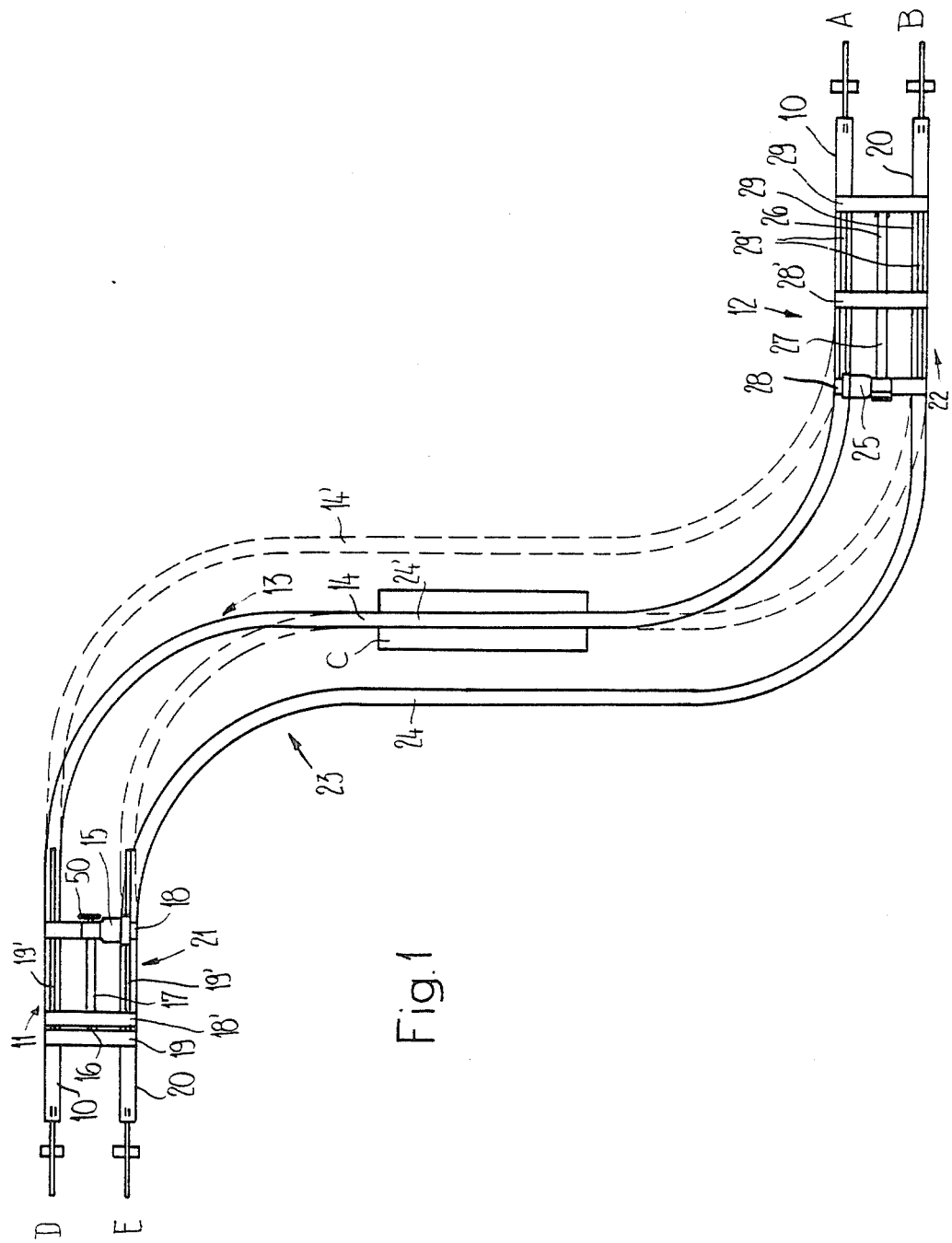
FIG. 1 is a top plan view of an exemplary embodiment of the inventive conveying device containing a substantially S-shaped guide channel section located between two transition sections of such conveying device.

Describing now the drawings, it is to be understood that to simplify the showing thereof only enough of the structure of the conveying device has been illustrated therein as is needed to enable one skilled in the art to readily understand the underlying principles and concepts of this invention. Turning now specifically to FIG. 1 of the drawings, the apparatus illustrated therein by way of example and not limitation will be seen to comprise two adjacently extending guide channels 10 and 20, each of which guides an endless chain 30 for entraining objects or articles to be conveyed and which chains 30 are driven independently of one another. Each of the two guide channels 10 and 20 comprises two respective transition sections 11, 12 and 21, 22 which extend in the same direction. Displaceable guide channel sections 13 and 23 are arranged between their related two transition sections 11, 12 and 21, 22 and can be displaced in a longitudinal direction relative to these two transition sections 11, 12 and 21, 22. In the region of a station C each displaceable guide channel section 13 and 23 comprises an intermediate member or component 14 and 24, respectively, which extends at an angle to the related transition section 11, 12 and 21, 22. The transition sections 11, 12 and 21, 22 are arranged in such a manner that, in each case, one transition section 11 or 12, 21 or 22 is extended at the time at which the related other transition section 12 or 11, 22 or 21 is retracted.

In the presently described exemplary embodiment, the transition sections 11, 12 and 21, 22 of both guide channels 10 and 20 are intercoupld for simultaneous displacement such that, after displacement, the intermediate member or component 24 occupies the previous position of the intermediate member or component 14 above the station C. The positions after displacement are indicated by broken lines and the intermediate member or component 14 occupies a position 14' and the intermediate member or component 24 occupies a position 24'. Consequently, length of displacement must correspond to the interval or spacing between the center lines of the two intermediate members or components 14 and 24 which extend substantially parallel to each other.

For the displacement, the two transition sections or section pairs 11 and 21, 12 and 22 are each equipped with related displacing drives or drive means 15 and 25 containing electric motors. The two displacing drive means 15 and 25 are mounted at the respective displaceable guide channel sections 13 and 23 such that they also travel the displacement length. In order to convert the rotary motion of the electric motors of the displacing drive means 15 and 25 into linear displacement paths, suitable spindles are employed which are not particularly visible in FIG. 1 and which are guided in related displacing tubes 16 and 26. The two displacing tubes 16 and 26 are each guided within related connecting tubes 17 and 27. The connecting tubes 17 and 27 each interconnect two related displaceable traverses or crossties 18, 18' and 28, 28' which, in turn, interconnect the intermediate members or components 14 and 24 in a rigid mutual relationship. The arriving guide channels 10 and 20 are connected to each other in the region of the related transition sections 11, 21 and 12, 22 by stationary traverses or crossties 19 and 29. The displacing tubes 16 and 26 are mounted at the related stationary traverses 19 and 29. Guide rods 19' and 29' connected with the related stationary traverses 19 and 29 serve to guide the displaceable elements, and each one of the guide rods 19' and 29' is associated with a related one of the two guide channels 10 and 20.

In the illustrated embodiment and as shown in FIG. 1, the displacement of the two displaceable guide channel sections 13 and 23 serves for effecting object or article delivery to station C, in one case from station A and in the other case from station B. In practice, both guide channels 10 and 20 can be in operation simultaneously, for example, for object or article delivery from A to C or D and from B to E. It is self-evident that a plurality of combinations can be made by such displacement so that, for example, two adjacently located stations can be alternately served by one guide channel. Also, the station C does not have to be a receiving station since it is equally possible for a delivery or dispatch station to be located in the region of the displaceable guide channel sections 13 and 23.

FIG. 2a shows a side view of the arrangement shown in FIG. 1. It is especially clear from this FIG. 2a that the previously mentioned endless chain 30 extends around related chain or sprocket wheels 31 and 32 at the two ends of the guide channel 20. At least one of the two chain or sprocket wheels 31 and 32 constitutes a driven wheel. The return of the endless chain 30 is effected through a return channel 31 which does not contain a displaceable section as will be self-evident. It is especially clear from FIG. 2a that no change occurs in the length of the displaceable guide channel section 23 during its displacement.

In FIG. 2b, the displaceable guide channel section 23 is shown displaced into the other position as compared to FIG. 2a.

In FIG. 3, the guide channel 10 or 20 is shown in cross-section conjointly with the therein guided endless chain 30. This endless chain 30 constitutes a universal-joint link chain of conventional construction provided with travelling wheels 34 and 34' on opposite sides. The guide channel 10 is substantially C-shaped in cross-section and is provided over its entire length with a downwardly directed opening serving as a guide slot 35. Guide wheels 36, which are connected with the endless chain 30, are laterally guided in the guide slot 35.

FIG. 4 illustrates the manner in which the same endless chain 30 is guided within an extendable guide channel which corresponds to either one of the transition sections 11 or 12. A clamp 37 is symbolically illustrated as being connected with the endless chain 30 below the same and extends externally of the guide channel 10 or 20. The clamp 37 serves as an entrainment member for printed products, for example, newspapers delivered in an imbricated formation. Outer guide members or components 38 of the guide channel are mounted at the displaceable traverse or crosstie 18' or 28', as the case may be, by means of a connecting member or component 39. This displaceable traverse 18' or 28', for example, may consist of a square or rectangular tube. Furthermore, it is clear from FIG. 4 in which manner the traverse 18' or 28' is guided in the displacement direction at the related one of the two guide rods 19' and 29' already shown in FIG. 1. Inner guide members or components 40 and 40' are longitudinally displaceably arranged within the outer guide members or components 38 of the guide channel.

FIG. 5 and 6 respectively show the inner guide members or components 40 and 40' and the outer guide members or components 38 in the extended state. Only the inner guide members or components 40 and 40' together with the endless chain 30 are illustrated in FIG. 5 and only the outer guide members or components 38 together with the endless chain 30 are illustrated in FIG. 6. In the two FIGS. 5 and 6, it is distinctly recognized that in each case approximately one half of the rolling surfaces 41, 41', 42 and 42' are located at the related inner guide members or components 40 and 40' and at the outer guide members or components 38. Substantially U-shaped rails which constitute the inner guide members or components 40 and 40' and face each other, surround the outer regions of the related travelling wheels 34 and 34'. The associated portions of the rolling surfaces 41 and 41' are located in the legs or flanges of such rails.

The outer guide members or components 38 as illustrated in FIG. 6 are provided with recesses 43 and 43' adapted to the substantially U-shaped rails or inner guide members or components 40 and 40' shown in FIG. 5. The rolling surfaces 42 and 42' directly adjoin the related recesses 43 and 43'.

In order to ensure lateral guidance of the endless chain 30 also in the inner guide members or components 40 and 40', lateral guide rails 44 and 44' for guiding the guide wheels 36 are associated with the inner guide members or components 40 and 40' in a spaced relationship. The outer guide members or components 38 contain related longitudinal grooves 45 and 45' for accommodating the guide rails 44 and 44' in the retracted state.

In FIG. 7, the previously mentioned displacing drives or drive means 15 or 25 are indicated and respectively contain a motor 46 and a miter or bevel gear drive 47. An output shaft 48 of the miter gear drive 47 is connected by means of a gear drive 49, 50 with the spindle 51 previously mentioned with respect to FIG. 1 although not illustrated in FIG. 1 but depicted in FIG. 7. The spindle 51 is journalled in the related displaceable traverse 18 or 28 shown in FIG. 1 by means of a ball-bearing 52 in an axially non-displaceable manner. The related connecting tube 17 or 27, as illustrated in FIG. 1, extends from the displaceable traverse 18 or 28. The related displacing tube 16 or 26 is arranged or located in the connecting tube 17 or 27. At the end of the displacing tube 16 or 26, a nut 53 is arranged or located and engages a thread of the spindle 51. The displaceable tube 16 or 26 is welded at its other end to the related stationary traverse or crosstie 19 or 29 as illustrated in FIG. 1 and thus is not only secured to this stationary traverse 19 or 29 but also secured against rotation.

Figure 8:
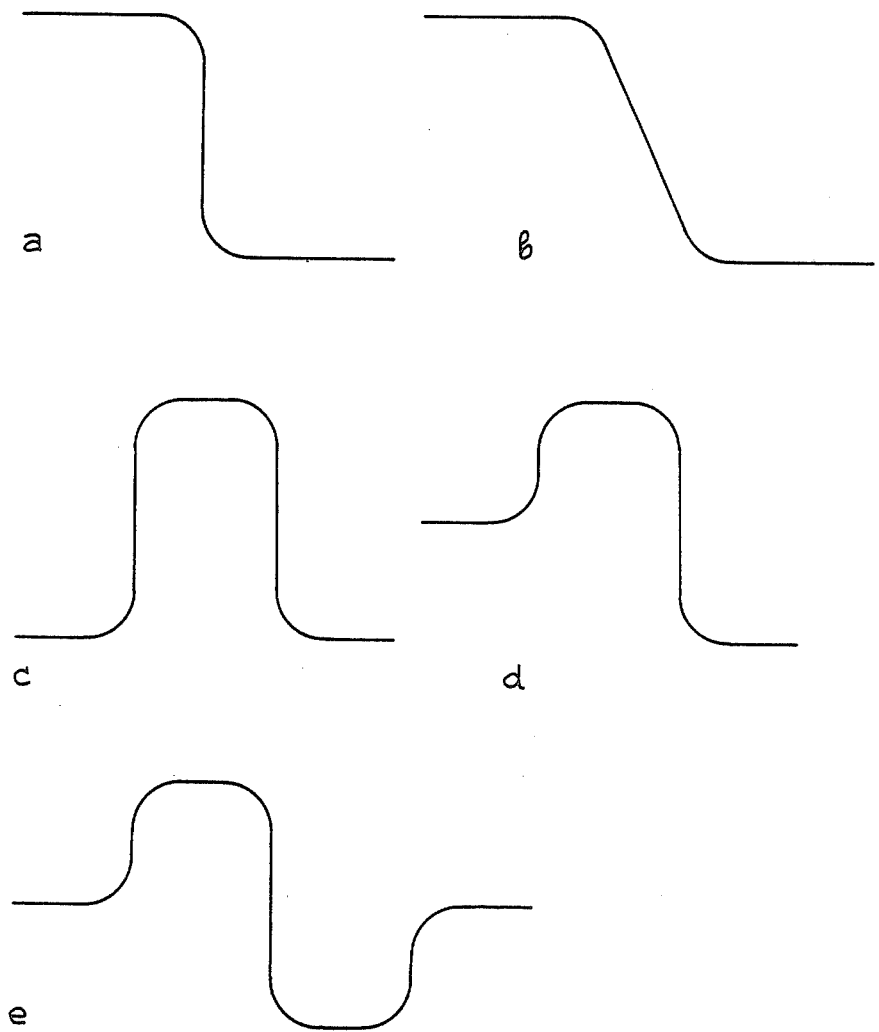
FIG. 8a–e schematically illustrates possible variants of the displaceable guide channel section in the conveyor device shown in FIG. 1.

A substantially S-shaped displaceable guide channel section 13 or 23 is illustrated in FIG. 1. It is, however, also possible to select any other suitable shape or configuration corresponding to the prevailing spatial conditions. In addition to the substantially S-shaped configuration a, FIG. 8 illustrates further variants b, c, d and e of possible configurations of the displaceable guide channel section. The only condition for selecting the configuration is that the two transition sections preceding and following the displaceable guide channel section must extend in the same direction.

In the illustrated embodiment as shown in FIG. 1, each one of the two transition sections 11, 12 and 21, 22 is equipped with related displacing drives or drive means 15 and 25. In order to avoid canting during displacement, it is advisable to synchronize the two displacing drives or drive means 15 and 25. Instead of two displacing drive means, it is, however, also possible to provide only one displacing drive means and to interconnect the two transition sections by means of a Cardan shaft.

In the illustrated embodiment as shown in FIG. 1, displacement is effected from the position illustrated by solid lines to the position illustrated by broken lines, i.e. to the right in FIG. 1 of the drawings, by activating the two displacing drives or drive means 15 and 25. During this operation the spindle 51, illustrated in FIG. 7, is extended or shifted in the transition section illustrated on the left of FIG. 1 and is retracted or shifted in the transition section illustrated on the right of such FIG. 1. The displaceable traverses 18 and 18' are moved away conjointly with the displacing drive or drive means 15 from the stationary traverse 19. The displaceable traverses 28 and 28' located on the right side of FIG. 1 approach the stationary traverse 29. At the end of the displacement path, the intermediate section 24 is located in the position 24' and substantially above the station C, whereas the intermediate section 14 takes up the position 14'.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A conveying device comprising:
   at least one guide channel;
   at least one endless chain guided within the at least one guide channel;
   said least one endless chain entraining objects to be conveyed from a first station to a second station;
   two transition sections extending in substantially the same predetermined direction provided for said at least one guide channel;
   said at least one guide channel including at least one displacaeable guide channel arranged between said two transition sections;
   displacing means for displacing said at least one displaceable guide channel section substantially in said predetermined direction and relative to said two transition sections;
   said at least one displaceable guide channel section containing an intermediate member; and
   said intermediate member extending at a predetermined angle relative to said two transition sections in the region of one of said first and second stations.

2. The conveying device as defined in claim 1, wherein:
   said at least one guide channel constitutes two mutually adjacently extending guide channels;
   said at least one displaceable guide channel section constituting two displaceable guide channel sections each one of which is associated with one of said two guide channels and each of which contains one said intermediate member;
   said two displaceable guide channel sections being intercoupled for simultaneous displacement by said displacing means in a predetermined displacement direction by a predetermined length of displacement;
   said intermediate members extending substantially parallel to each other and defining related center lines extending at a predetermined mutual spacing; and
   said predetermined length of displacement in said predetermined displacement direction corresponding to said predetermined mutual spacing between said center lines defined by said intermediate members.

3. The conveying device as defined in claim 2, wherein:
   each one of said two displaceable guide channel sections has a substantially S-shaped configuration.

4. The conveying device as defined in claim 2, wherein:
   each one of said two guide channels has a substantially C-shaped cross-section for guiding one said endless chain;
   each said endless chain being provided with travelling wheels on opposite sides thereof;
   each one of said two guide channels containing rolling surfaces on which said travelling wheels of said endless chain associated with said guide channel roll during operation of said endless chain;
   a predetermined number of entrainment members for entraining the objects to be conveyed;
   said entrainment members being mounted on said endless chain and protruding from said associated guide channel,
   two said transition sections being operatively associated with each one of said two guide channels;
   each one of said two transition sections containing stationarily arranged guide members and extendable guide members cooperating with said stationarily arranged guide members;
   each of said transition sections possessing rolling surfaces defining a longitudinal direction and being subdivided in said longitudinal direction thereof; and
   a first portion of said subdivided rolling surfaces being associated with said stationary guide members and a second portion of said subdivided rolling surfaces being associated with said extendable guide members.

5. The conveying device as defined in claim 4, wherein:
   selectively either said stationary guide members or said extendable guide members are subdivided into two substantially U-shaped rails which face each other and define related legs;
   said two substantially U-shaped rails constituting inner guide members;
   the remaining guide members constituting outer guide members;
   each one of said substantially U-shaped rails extending around an outer region defined by said travelling wheels;
   an associated one of either said first portion or said second portion of said subdivided rolling surfaces being arranged at related ones of said legs defined by said substantially U-shaped rails;
   each said extendable guide member assuming, during operation of the conveying device, either an extended state or a retracted state; and
   said substantially U-shaped rails being enclosed by related ones of said outer guide members in said retracted state of said extendable guide members.

6. The conveying device as defined in claim 5, wherein:
   said outer guide member contains recesses having a predetermined cross-section;
   said predetermined cross-section of each one of said recesses being adapted to said substantially U-shaped rails in order to accommodate said substantially U-shaped rails; and
   said second portions of said subdivided rolling surfaces associated with said extendable guide member directly adjoining said recesses.

7. The conveying device as defined in claim 6, wherein:
   said endless chain is provided with guide wheels;

each one of said two guide channels having substantially C-shaped cross-section defining an opening;

said guide wheels of said endless chain engaging said opening defined by the associated one of said two guide channels in order to thereby laterally guide said endless chain;

two lateral guide rails;

each one of said two lateral guide rails being associated with a related one of said two substantially U-shaped rails and arranged in a spaced relationship with respect to said substantially U-shaped rails;

each said outer guide member containing a longitudinal groove; and each one of said two lateral guide rails engaging said longitudinal groove in an associated one of said outer guide members.

8. The conveying device as defined in claim 5, wherein:

said inner guide members constitute said stationarily arranged guide members.

9. The conveying device as defined in claim 1, wherein:

said displacing means for displacing said at least one displaceable guide channel section constitute a predetermined number of displacing drives each of which is associated with a respective one of said two transition sections.

10. The conveying device as defined in claim 9, further including:

means for electrically synchronizing said predetermined number of displacing drives.

11. The conveying device as defined in claim 1, further including:

a Cardan shaft for operatively interconnecting said two transition sections; and said displaying means constituting a common displacing drive acting upon said Cardan shaft.

12. The conveying device as defined in claim 9, wherein:

each one of said two transition sections containing stationarily arranged guide members and extendable guide members cooperating with said stationarily arranged guide members;

each one of said predetermined number of displacing drives being rigidly connected with a related one of said extendable guide members; and each said displacing drive containing a rotary drive member coupled to a spindle for converting the rotary motion of said rotary drive member into a linear motion.

13. A conveying device for conveying objects between a predetermined number of stations and comprising:

at least one guide channel;

at least one endless conveyor chain guided within said at least one guide channel and entraining the objects to be conveyed between a selected one of said predetermined number of stations and an other one of said predetermined number of stations;

two transition sections extending in substantially the same predetermined direction provided for said at least one guide channel;

said at least one guide channel including at least one displaceable guide channel section arranged between said two transition sections;

said at least one displaceable guide channel section containing an intermediate member extending at a predetermined angle relative to said two transition sections; and displacing means for displacing said at least one displaceable guide channel section substantially in said predetermined direction and relative to said two transition sections.

* * * * *

UNITED STATES PATENT AND TRADEMARK OFFICE
CERTIFICATE OF CORRECTION

PATENT NO. : 4,738,354

DATED : April 19, 1988

INVENTOR(S) : HANS FREI

It is certified that error appears in the above-identified patent and that said Letters Patent is hereby corrected as shown below:

Column 3, line 58, please delete "8 a-e" and insert --8--

Column 3, line 39, after "2a" please insert --is a--

Column 4, line 25, please delete "intercoupld" and insert --intercoupled--

Column 4, line 33, after "consequently," please insert --the--

Column 5, line 19, please delete "31" and insert --33--

Column 7, line 31, please delete "displacaeble" and insert --displaceable--

Column 7, line 31, after "channel" please insert --section--

Signed and Sealed this

Eleventh Day of October, 1988

Attest:

DONALD J. QUIGG

*Attesting Officer*   *Commissioner of Patents and Trademarks*